United States Patent
Satish et al.

(10) Patent No.: US 8,079,030 B1
(45) Date of Patent: Dec. 13, 2011

(54) DETECTING STEALTH NETWORK COMMUNICATIONS

(75) Inventors: Sourabh Satish, Fremont, CA (US);
Brian Hernacki, San Carlos, CA (US)

(73) Assignee: Symantec Corporation, Mountain View, CA (US)

(*) Notice: Subject to any disclaimer, the term of this patent is extended or adjusted under 35 U.S.C. 154(b) by 1309 days.

(21) Appl. No.: 11/685,534

(22) Filed: Mar. 13, 2007

(51) Int. Cl.
*G06F 9/455* (2006.01)
*H04L 29/06* (2006.01)

(52) U.S. Cl. .......... 718/1; 713/164

(58) Field of Classification Search .......... None
See application file for complete search history.

(56) References Cited

U.S. PATENT DOCUMENTS

| | | | |
|---|---|---|---|
| 2007/0156900 A1* | 7/2007 | Chien | 709/225 |
| 2007/0266433 A1* | 11/2007 | Moore | 726/15 |
| 2008/0163207 A1* | 7/2008 | Reumann et al. | 718/1 |

* cited by examiner

*Primary Examiner* — Meng An
*Assistant Examiner* — Eric Wai

(74) *Attorney, Agent, or Firm* — Fenwick & West LLP

(57) ABSTRACT

A computer has a hypervisor that supervises a virtual machine. The virtual machine includes a guest security module that enforces a security policy on network traffic entering and exiting the virtual machine. Malicious software (malware) uses stealth network communications to avoid the guest security module and attempts to communicate with its home base. A security module within the hypervisor has access to all network communications entering and exiting the computer. The security module communicates with the guest security module to identify communications of which the guest security module is aware. The security module analyzes the network communications for the computer to identify a stealth network communication of which the guest security module is unaware. The security module alters the stealth network communication, thereby prevent the malware from communicating with its home base.

15 Claims, 4 Drawing Sheets

DETECTING STEALTH NETWORK COMMUNICATIONS

BACKGROUND

1. Field of the Invention

This invention pertains in general to protecting a computer from malicious software and in particular to techniques for detecting malicious software that uses stealth network communications to hide its presence.

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker by stealing confidential information. For example, malware can surreptitiously capture logins, passwords, bank account identifiers, and credit card numbers and send this information to a remote server on the Internet. Similarly, the malware can provide hidden interfaces that allow the attacker to access and control the compromised computer. In some cases, the attacker assembles a vast number of compromised computers, called "bots," and uses the bots to launch distributed denial-of-service (DDOS) attacks and perform other malicious actions.

Traditional security techniques for detecting and blocking malware include malware scanners and firewalls. Malware scanners typically detect malware residing on a computer through signature-scanning and/or heuristic-based techniques. Once detected, the malware can be removed from the computer. Firewalls, in contrast, monitor network communications in order to identify, and optionally block, unknown and/or unauthorized traffic. The risks associated with malware that relies on network communications with a home base can be mitigated if the firewall blocks the communications. For example, blocked malware cannot send captured information to its home base and cannot participate in DDOS attacks.

Unfortunately, malware is increasingly difficult to detect using conventional security techniques. A malicious website might automatically generate new malware code for every few visitors. As a result, it becomes impractical to generate signatures (and use signature scanning-based techniques) to detect it. In addition, some malware uses "stealth" or "rootkit" techniques to hide its presence from malware scanners.

Equally troubling is that malware can use stealth techniques to hide its network communications from conventional software firewalls. For example, the malware can patch the Network Driver Interface Specification (NDIS) layer functionality provided by MICROSOFT WINDOWS and other operating systems to hide communications from the firewall. Likewise, the malware can insert an alternative network communications stack into the operating system that the firewall does not recognize. Hardware firewalls are often unable to detect and block malware communications because the malicious network traffic is usually indistinguishable from other traffic.

Accordingly, there is a need in the art for a way to detect and block stealth network communications in order to prevent malware from communicating with its base and/or performing other malicious actions.

BRIEF SUMMARY OF THE INVENTION

The above and other needs are met by a method, system, and computer program product that detects stealth network communications in a computer having a hypervisor supervising a virtual machine. Embodiments of the method for detecting stealth network communications include analyzing network communications of the computer, identifying a stealth network communication of which a guest security module in the virtual machine is unaware, and altering the stealth network communication. Embodiments of the system and computer program product for detecting stealth network communications include a communications module for communicating with a guest security module executing within the virtual machine to identify network communications on a virtualized network interface of the virtual machine of which the guest security module is aware, a verification module for identifying a stealth network communication of which the guest security module is unaware, and an alteration module for altering the stealth network communication.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Figure 1:
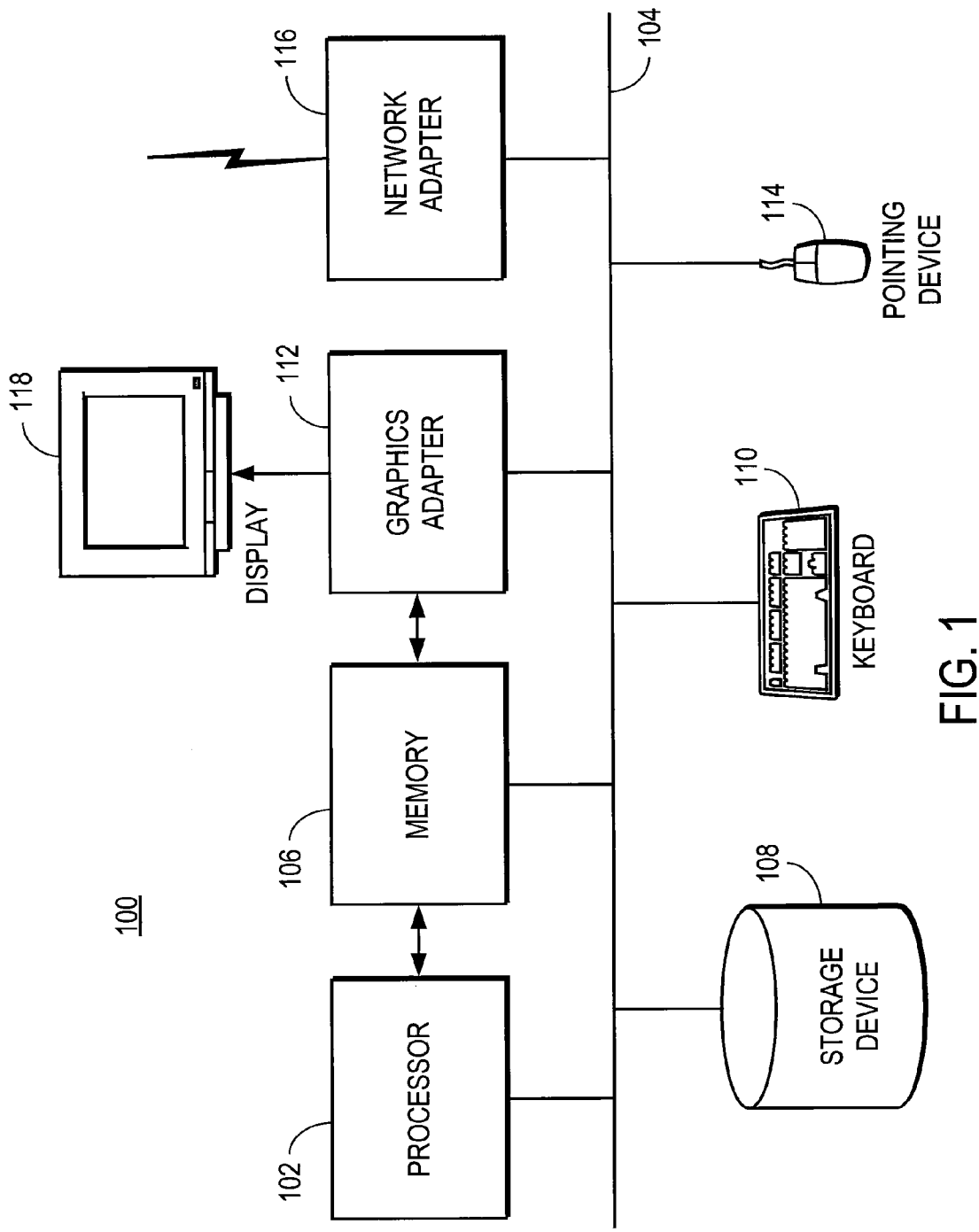
FIG. 1 is a high-level block diagram illustrating a computer using a hypervisor to provide security according to one embodiment.

FIG. 1 is a high-level block diagram illustrating a computer 100 using a hypervisor to provide security according to one embodiment. Illustrated are at least one processor 102 coupled to a bus 104. The processor 102 includes virtualization technology allowing it to support one or more virtual machines. Examples of virtualization technologies include Intel Virtualization Technology (IVT) and AMD Virtualization (AMD-V) for x86 processor architectures. Also coupled to the bus 104 are a memory 106, a storage device 108, a keyboard 110, a graphics adapter 112, a pointing device 114, and a network adapter 116 for communicating on a network. A display 118 is coupled to the graphics adapter 112. The storage device 108 is a device such as a hard drive, CD or DVD drive, or flash memory device, and holds executable code and/or data utilized during the operation of the computer 100. The memory 106, in one embodiment, is a random access memory (RAM) and holds instructions and data loaded from the storage device 108, generated during processing, and/or from other sources.

This description utilizes the term "module" to refer to computer program logic for providing a specified functionality. A module can be implemented in hardware, firmware, and/or software. A module is typically stored on the storage device 108, loaded into the memory 106, and executed by the processor 102. A module can include one or more processes, and/or be provided by only part of a process.

Computers acting in different roles may have different and/or additional elements than the ones shown in FIG. 1. For example, a computer 100 acting as a server may have greater processing power and a larger storage device than a computer acting as a client. Likewise, a computer 100 acting as a server may lack devices such as a display 118 and/or keyboard 110 that are not necessarily required to operate it.

Figure 2:
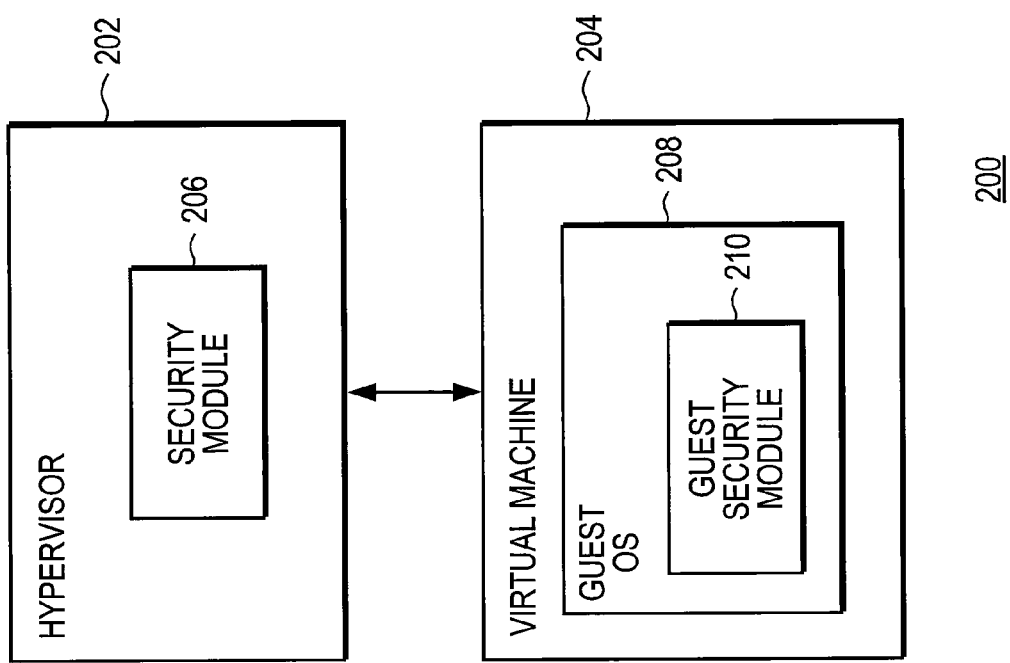
FIG. 2 illustrates a logical view of a virtual computing environment provided by the processor and software according to one embodiment.

FIG. 2 illustrates a logical view of a virtual computing environment 200 provided by the processor 102 and software according to one embodiment. The environment 200 includes a hypervisor 202 that supervises the operation of a virtual machine 204. In one embodiment, the hypervisor 202 has access to the real network interface of the computer and, therefore, has access to all network communications exiting or entering the computer via the hardware network adapter 116. The hypervisor 202, and modules executing within or under direct supervision of the hypervisor, can view and optionally alter the network communications. For example, the alterations can include blocking, redirecting, and changing communications. In one embodiment, the hypervisor 202 executes a security module 206. As described in more detail below, the security module 206 monitors the network communications in order to selectively alter stealth communications potentially associated with malware.

The virtual machine 204 is a hardware-assisted emulated environment for running software under control of the hypervisor 202. In one embodiment, the virtual machine 204 provides software running on it with a virtualized processor, virtualized address space, and virtualized network interface. Software within the virtual machine uses the virtualized network interface to communicate with computers on the Internet and/or other networks. In some embodiments, certain aspects of the virtual machine are virtualized while others, such as the input/output (I/O) devices, are not.

The virtual machine 204 executes an operating system such as a variant of MICROSOFT WINDOWS or LINUX. The operating system in the virtual machine is referred to herein as the "guest OS" 208 in order to distinguish it from the operating system provided by the hypervisor. In one embodiment, the guest OS 208 is a 64-bit version of WINDOWS VISTA. In general, the guest OS 208 executes one or more application programs and/or services. These programs and services are formed of one or more processes.

A guest security module 210 operates in the virtual machine 204. In one embodiment, the guest security module 210 includes a firewall that detects and optionally blocks network communications sent or received by the virtual machine 204 via the virtualized network interface. In one embodiment, the guest security module 210 can also enumerate processes executing within the guest OS 208, and identify processes that are listening for inbound network communications. For example, the guest security module 210 can determine that a particular process is listening for messages on a particular transmission control protocol (TCP) and/or user datagram protocol (UDP) port. Embodiments of the guest security module 210 can also perform other security-related functions not described in detail herein, such as detecting viruses and other malware using signature scanning In some embodiments the guest security module 210 is a standalone security application while in other embodiments it is integrated into the guest OS 208 or other software.

In one embodiment, the guest security module 210 enforces a security policy that implements access control rules describing network communications permitted and denied with respect to the virtual machine 204. A typical security policy permits certain types of communications by web browsers and other application programs that are known to require network access, but blocks communications by programs that are unknown or not known to require network access. In one embodiment, the guest security module 210 creates identifiers for certain types of communications as they are detected and permitted. For example, the guest security module 210 can create an identifier for a TCP or UDP connection request that contains the (remote IP address, remote port, local IP address, local port) quadruple in the request. This identifier is referred to as the "host-port quadruple." The guest security module 210 can identify other types of traffic, such as domain name service (DNS) resolution requests, using similar techniques.

In one embodiment, the guest security module 210 sends messages describing its security policy to the security module 206 in the hypervisor 202. These messages can describe communications that are always permitted. For example, a message can state that a particular type of communication with a particular remote computer on the Internet (e.g., a communication identified by a particular host-port quadruple) is always allowed. In addition, the messages can identify real-time connection requests and other communications of which the guest security module 210 is aware. For example, the guest security module 210 can send the security module 206 in the hypervisor 202 a message identifying a TCP connection request made by a web browser concurrent with the guest security module 210 permitting the request. Further, the messages can identify communications that the guest security module 210 expects to receive. For example, the guest security module 210 can send a message stating that it is expecting inbound communications on TCP port 80 because a web server in the guest OS 208 is listening for communications on this port. The messages can also describe changes to the security policy such as once-allowed communications that are now blocked.

In one embodiment, the security module 206 in the hypervisor 202 and the guest security module 210 in the virtual machine 204 cooperate to detect stealth, or hidden, network communications. The security module 206 analyzes network communications emanating from the virtual machine 204 and/or entering into the computer 100 and interacts with the guest security module 210 to determine whether the latter module is aware of the communications. If the security module 206 in the hypervisor 202 detects a communication of which the guest security module 210 is unaware, then there is a likelihood that the communication was stealthed by malware. Accordingly, one embodiment of the security module 206 alters the communication in order to block it. This technique mitigates the threats posed by the many types of malware that require communications with a home base in order to operate.

Figure 3:
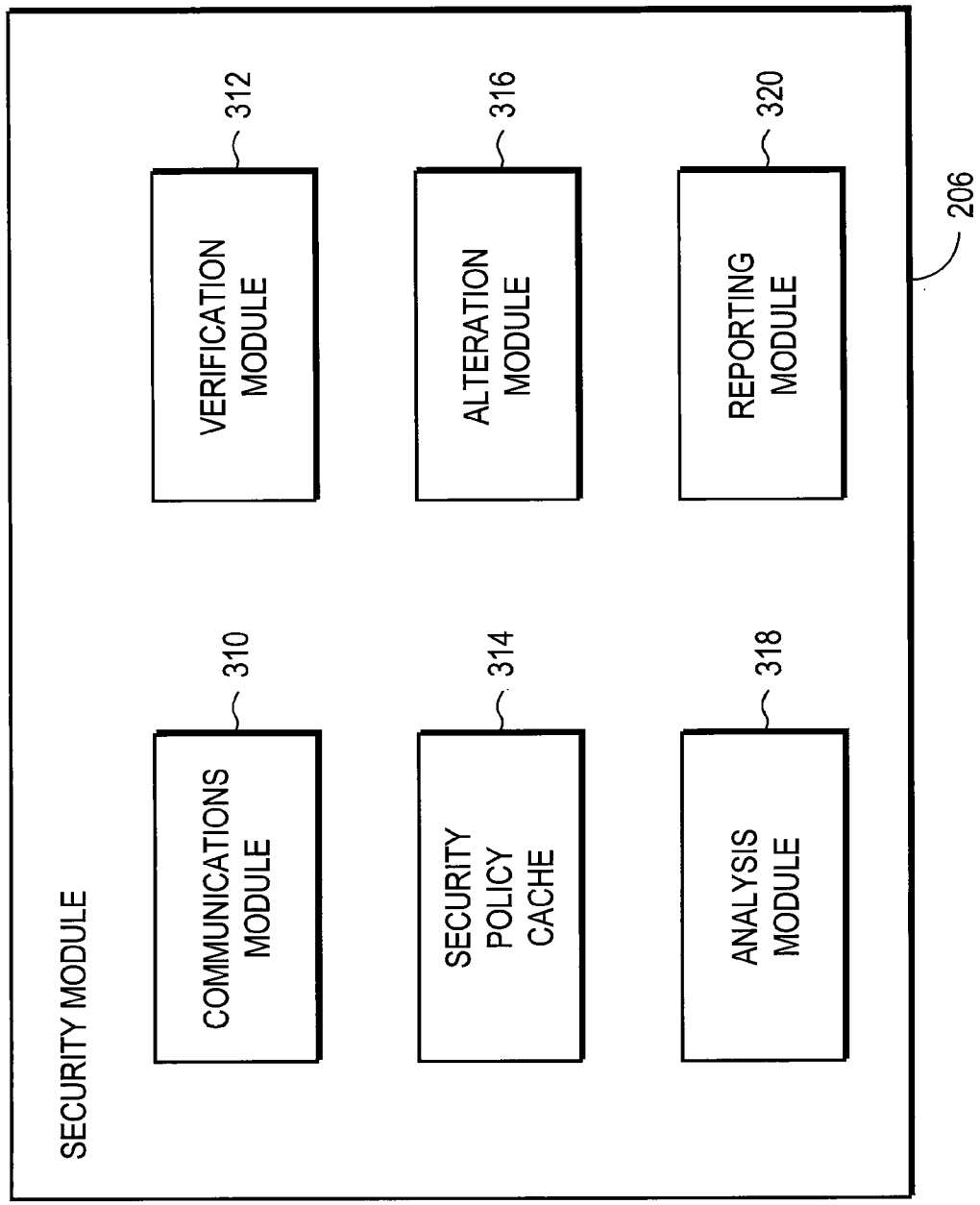
FIG. 3 is a high-level block diagram illustrating modules within the security module in the hypervisor according to one embodiment.

FIG. 3 is a high-level block diagram illustrating modules within the security module 206 in the hypervisor 202 according to one embodiment. Other embodiments can have different and/or additional modules than the ones shown in the figure. In addition, the functions can be distributed among the modules in a different manner than is described here.

A communications module 310 establishes a communications channel between the security module 206 in the hypervisor 202 and the guest security module 210 in the virtual machine 204. The guest security module 210 and the security module use the communications channel to exchange messages. In one embodiment, the communications channel is secured in order to prohibit eavesdropping or tampering by malware executing in the guest OS 208. For example, the communications module 310 can create a secure channel by establishing a shared memory region that can be accessed by only the security modules 206, 210. Similarly, the communications module 310 can create a secure channel using conventional inter-process communication (IPC) and/or remote procedure call (RPC) techniques. In one embodiment, the security module 206 and guest security module 210 additionally use a challenge/response code sent over the communications channel established by the communications module 310 in order to ensure that both parties to the communications are legitimate.

A security policy cache 312 caches the security policy messages received from the guest security module 210. Thus, the security policy cache 312 describes the security policy implemented by the guest security module 210. In one embodiment, the security policy cache 312 maintains a white list of network communications that are always permitted by the guest security module 210. The communications on the white list can include outbound communications identified by host-port quadruples, inbound communications identified by the port number, and the like. In addition, an embodiment of the security policy cache 312 maintains a list of the real-time connection request identifiers received from the guest security module 210. In some embodiments, the security policy cache 312 is absent.

An analysis module 314 analyzes network communications entering and exiting the computer 100. As described above, the analysis module 314 can access all network communications due to the module's privileged location within the hypervisor 202. In one embodiment, the analysis module 314 analyzes network communications exiting the computer 100 to identify communications attempting to establish new connections with remote computers. For example, the analysis module 314 can generate the host-port quadruple identifiers for outbound TCP connection requests. In the same manner, an embodiment of the analysis module 314 analyzes inbound network communications to identify communications directed to processes executing in the virtual machine 204. In some embodiments, the analysis module 310 identifies other types of communications, such as domain name service (DNS) resolution requests, in addition to, or instead of connection requests.

A verification module 316 verifies that the guest security module 210 is aware of network communications identified by the analysis module 316. In one embodiment, the verification module 316 receives identifiers of the communications identified by the analysis module 314 and determines whether the communications are permitted by the security policy described by the security policy cache 312. For example, the verification module 316 can receive the host-port quadruple identifier for an outbound TCP connection request from the analysis module 314 and determine whether the identifier is in the white list of communications that are always permitted by the guest security module 210. If the identifier is not in the white list, or the white list is absent, an embodiment of the verification module 316 determines whether the identifier is in the list of real-time connection identifiers recently received from the guest security module 210. Similarly, the verification module 316 can receive an identifier of an inbound connection request and determine whether the connection is permitted by the security policy.

In some embodiments, the verification module 316 interacts directly with the guest security module 210 to determine whether the latter module is aware of an identified network communication. These interactions can occur in addition to, or instead of, the verification module 316 accessing the security policy cache. For example, the verification module 316 can send the guest security module 210 the identifier for an outbound connection request detected by the analysis module 314. The guest security module 210, in turn, replies with a message indicating whether is aware of the request, and/or whether the security module 206 should block the request. Also, the verification module 316 can send the guest security module 210 the identifier of an inbound communication. The guest security module 210 determines whether the inbound communication will be handled by a process that is known and visible to it, and replies with a message indicating whether it is aware of (i.e., permits) inbound communications to the process, and/or whether the communication should be blocked.

Likewise, the guest security module 210 can send identifiers of detected and/or permitted network communications directly to the verification module 316. The verification module 316 correlates the received identifiers with the communications detected by the analysis module 314. The verification module 316 detects any deviations between the network communications expected based on the messages from the guest security module 210 and the network communications encountered by the analysis module 314. Other embodiments use other variations of these techniques for determining whether the guest security module 210 is aware of a network communication detected by the analysis module 314.

An alteration module 318 alters communications that are detected by the analysis module 314 but not known to the guest security module 210. As described above, these types of communications are likely sent by malware that is using stealth techniques to hide its communications from the guest security module 210. An embodiment of the alteration module 318 alters the communications to effectively block them and thereby prevent the malware from communicating with its home base or another location on the network.

In one embodiment, the alteration module 318 alters the communications in ways that cause the communications sessions to fail gracefully. That is, the alteration module 318 causes the communications sessions to appear as if they failed due to normal and common network communications problems. Malware and other software are likely to include logic for processing normal communications problems, making it less likely that the software will crash or cause other problems within the guest OS 208. For example, an embodiment of the alteration module 318 consumes certain communications, thus making it appear as if the communications were never sent or never received. An embodiment of the alteration module 318 redirects some outbound connection requests to different addresses, such as to the local host, or loopback address, of the computer 100. This redirection causes the requests to be denied. In one embodiment, the alteration module 318 alters different types of communications in different ways. For example, the module 318 consumes TCP connection requests, and redirects DNS requests to the local host. In addition, some embodiments of the alteration module 318 simply block communications from leaving (or entering) the computer 100.

In one embodiment, a reporting module 320 reports the results of the actions performed by the other modules within the security module 206. For example, an embodiment of the reporting module 320 generates an alert to a user and/or administrator of the computer 100 upon the detection or altering of possible stealth network communications. Similarly, an embodiment of the reporting module 320 generates a log describing the network communications analyzed, verified, and/or altered by the security module 206.

Figure 4:
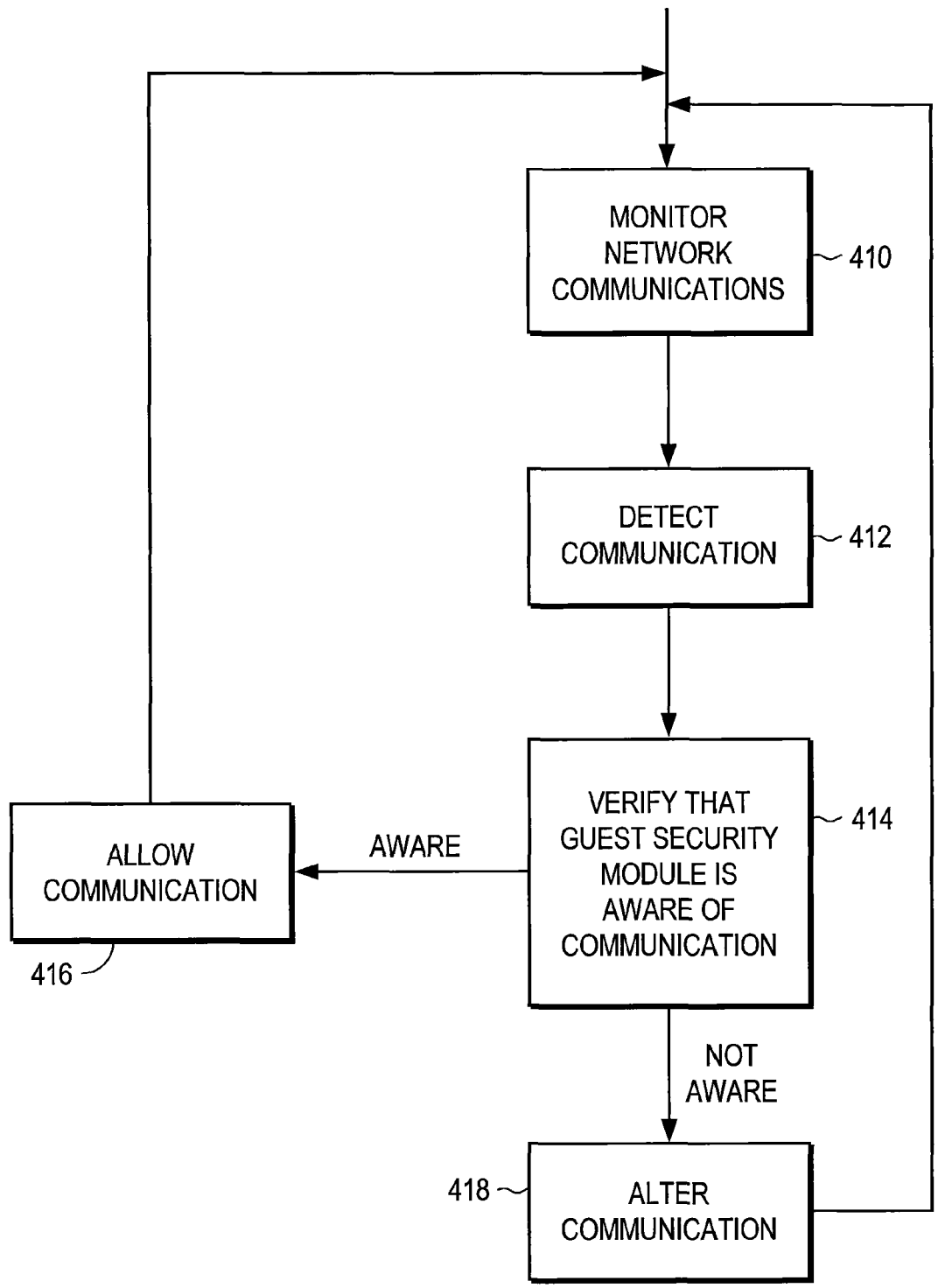
FIG. 4 is a flowchart showing a method of detecting and altering stealth communications according to one embodiment.

FIG. 4 is a flowchart showing a method of detecting and altering stealth communications according to one embodiment. Other embodiments perform different and/or additional steps than the ones described here. Moreover, other embodiments perform the steps in different orders. Since a typical computer 100 is simultaneously engaged in multiple network communication sessions, some embodiments may perform multiple instances of the steps of FIG. 4 concurrently.

Initially, the security module 206 in the hypervisor 202 monitors 410 outbound and/or inbound network communications. Upon detecting 414 a connection request and/or other type of communication, the security module 206 verifies 414 that the guest security module 210 is aware of the communication. In one embodiment, the security module 206 consults the security policy cache 312 to determine whether a white list contained therein identifies the communication as always permitted. Similarly, an embodiment of the security module 206 consults the cache 312 to determine whether the guest security module 210 has sent a real-time message indicating that the communication is permitted. In other embodiments, the security module 206 communicates directly with the guest security module 210 to determine whether the latter module is aware of the communication.

If the guest security module 210 is aware of the communication, the security module 206 allows 418 the communication to proceed. If the guest security module 210 is not aware of the communication, an embodiment of the security module 206 alters the communication 418 to block it. In one embodiment, the alteration causes the communication to fail as if it were caused by a normal and common network communications problem. Altering the communication in this manner prevents malware using stealth communications from communicating with its home base. Although not specifically shown in FIG. 4, the security module 206 can also report the alteration by alerting a user or administrator of the computer, and/or by recording the alteration in a log.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A method of detecting stealth network communications in a computer having a hypervisor supervising a virtual machine, the virtual machine having a virtualized network interface, the method comprising:
    establishing a secure communications channel between a guest security module executing within the virtual machine and a security module executing within the hypervisor;
    communicating, by the security module executing within the hypervisor using the secure communications channel, with the guest security module executing within the virtual machine to identify real-time network communications on the virtualized network interface of the virtual machine detected by the guest security module;
    maintaining, by the security module executing within the hypervisor, a list of the identified real-time network communications on the virtualized network interface of the virtual machine detected by the guest security module;
    identifying, by the security module executing within the hypervisor, real-time network communications involving the computer;
    identifying, by the security module executing within the hypervisor, a stealth network communication on the virtualized network interface of the virtual machine undetected by the guest security module by correlating the identified real-time network communications involving the computer with the list of identified real-time network communications on the virtualized network interface of the virtual machine detected by the guest security module; and
    altering the stealth network communication.

2. The method of claim 1, wherein identifying real-time network communications involving the computer comprises:
    identifying connection requests directed to other computers on a network.

3. The method of claim 1, wherein identifying a stealth network communication comprises:
    consulting a white list describing permitted network communications on the virtualized network interface of the virtual machine.

4. The method of claim 1, wherein altering the stealth network communication comprises:
    blocking the stealth network communication.

5. The method of claim 1, wherein altering the stealth network communication comprises:
    causing the stealth network communication to fail gracefully.

6. A system for detecting stealth network communications in a computer having a hypervisor supervising a virtual machine, the virtual machine having a virtualized network interface, the system comprising:
    a non-transitory computer-readable storage medium storing executable computer program modules comprising:
        a security module for executing within the hypervisor and comprising:
            a communications module for:
                establishing a secure communication channel to a guest security module executing within the virtual machine; and
                communicating using the secure communication channel with the guest security module executing within the virtual machine to identify real-time network communications on the virtualized network interface of the virtual machine detected by the guest security module;
            a security policy cache for maintaining a list of the identified real-time network communications on the virtualized network interface of the virtual machine detected by the guest security module;
            an analysis module for identifying real-time network communications involving the computer;
            a verification module for identifying a stealth network communication on the virtualized network interface of the virtual machine undetected by the guest security module by correlating the identified real-time network communications involving the computer with the list of identified real-time network communications on the virtualized network interface of the virtual machine detected by the guest security module; and
            an alteration module for altering the stealth network communication; and
    a processor for executing the executable computer program modules.

7. The system of claim 6, wherein the security policy cache stores messages from the guest security module describing a security policy of the guest security module.

8. The system of claim 6, wherein the security policy cache stores a white list describing network communications that are permitted by the guest security module.

9. The system of claim 6, wherein correlating the identified real-time network communications involving the computer with the list of identified real-time network communication on the virtual network interface of the virtual machine detected by the guest security module comprises:
- determining whether the guest security module detected a connection request involving the virtual machine; and
- responsive to the connection request being undetected by the guest security module, identifying the connection request as a stealth network communication.

10. The system of claim 6, wherein the alteration module blocks the stealth network communication.

11. A computer program product having a non-transitory computer-readable storage medium having executable computer program instructions embodied therein for detecting stealth network communications in a computer having a hypervisor supervising a virtual machine, the virtual machine having a virtualized network interface, the computer program product comprising:
- a security module for executing within the hypervisor and comprising:
  - a communications module for:
    - establishing a secure communication channel to a guest security module executing within the virtual machine; and
    - communicating using the secure communication channel with the guest security module executing within the virtual machine to identify real-time network communications on the virtualized network interface of the virtual machine detected by the guest security module;
  - a security policy cache for maintaining a list of the identified real-time network communications on the virtualized network interface of the virtual machine detected by the guest security module;
  - an analysis module for identifying real-time network communications involving the computer;
  - a verification module for identifying a stealth network communication on the virtualized network interface of the virtual machine undetected by the guest security module by correlating the identified real-time network communications involving the computer with the list of identified real-time network communication on the virtualized network interface of the virtual machine detected by the guest security module; and
  - an alteration module for altering the stealth network communication.

12. The computer program product of claim 11, wherein the security policy cache stores messages from the guest security module describing a security policy of the guest security module.

13. The computer program product of claim 11, wherein the security policy cache stores a white list describing network communications that are permitted by the guest security module.

14. The computer program product of claim 11, wherein correlating the identified real-time network communications involving the computer with the list of identified real-time network communication on the virtual network interface of the virtual machine detected by the guest security module comprises:
- determining whether the guest security module detected a connection request involving the virtual machine; and
- responsive to the connection request being undetected by the guest security module, identifying the connection request as a stealth network communication.

15. The computer program product of claim 11, wherein the alteration module is adapted to block the stealth network communication.

\* \* \* \* \*